United States Patent
Hundscheidt et al.

(10) Patent No.: US 7,369,541 B2
(45) Date of Patent: *May 6, 2008

(54) MULTICAST IN A POINT-TO POINT ORIENTED PACKET-SWITCHED TELECOMMUNICATION NETWORK

(75) Inventors: Frank Hundscheidt, Kerkrade (NL); Ralf Keller, Wuerseien (DE); Thorsten Lohmar, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 763 days.

This patent is subject to a terminal disclaimer.

(21) Appl. No.: 10/481,072

(22) PCT Filed: Jun. 20, 2002

(86) PCT No.: PCT/EP02/06826

§ 371 (c)(1),
(2), (4) Date: May 12, 2004

(87) PCT Pub. No.: WO03/001717

PCT Pub. Date: Jan. 3, 2003

(65) Prior Publication Data

US 2005/0007969 A1    Jan. 13, 2005

(30) Foreign Application Priority Data

Jun. 21, 2001    (EP)    ................. 01115052

(51) Int. Cl.
*H04L 12/66* (2006.01)
(52) U.S. Cl. .............. 370/352; 370/390; 370/401; 370/312
(58) Field of Classification Search ........... 370/352, 370/390, 401, 432, 312, 408; 709/227, 236
See application file for complete search history.

(56) References Cited

FOREIGN PATENT DOCUMENTS

| EP | 1 071 296 | 1/2001 |
|----|-----------|--------|
| WO | WO 00 57601 | 9/2000 |

*Primary Examiner*—Melur Ramakrishnaiah (57) ABSTRACT

The invention relates to a method, network node, router, serving node and system for performing multicast in a point to point oriented telecommunication network. The basic idea is to introduce multicast transmission for parts of a network that is basically point-to-point oriented. This is done by creating transport multicast group tunnels between a router and a serving node in order to transport the multicast data. This invention describes the application of multicasting in point to point networks, such as UMTS with a scarce number of resources. In a mobile environment like in UMTS the idea could be implemented by using IP multicast for efficient transmission in the IP network between the SEGSN and GGSN for example on the Gn interface.

20 Claims, 7 Drawing Sheets

2 IP Layers in All-IP Networks:

Application-level; IP e2e between terminals or between terminals and application servers.

Transport lev. ; IP serves as the transport technology, or connectivity, between network nodes.

MULTICAST IN A POINT-TO POINT ORIENTED PACKET-SWITCHED TELECOMMUNICATION NETWORK

TECHNICAL FIELD OF THE INVENTION

The present invention relates to a method, network node, router, serving node and system for performing multicast transmission in a telecommunication network.

The present invention is especially applicable in a point-to-point oriented packet-switched telecommunication network.

BACKGROUND

Multicasting is a service that permits sources to send a single copy of the same data to an address that causes the data to be delivered to multiple recipients. Under multicasting only one copy of a message passes over any link in a network and copies of the message are made only where paths diverge. From the network perspective, multicast dramatically reduces overall bandwidth consumption, since the data is replicated in the network at appropriate points rather than in the end-systems. Further a server, which is sending multicast message needs to manage only one session.

Local area networks have supported multicasting for many years. For networks, where nodes share a common communication medium multicasting is easy to support. A specially addressed packet can be read off the communication medium by multiple hosts.

Extending multicasting capabilities to internetworks however led to the introduction of a router at the edge of a network in order to figure out dynamically how to forward the arriving data packets. The way of forwarding is for example delivered from the address included in the header of the data packet and from the routing table, which is administrated in the router. There are few possibilities of performing the multicast addressing, for example to use one address indicating the multicast group.

In case the multicast is used in Internet Protocol IP network then it is called IP multicast. Within the IP multicast the membership of a multicast session group is dynamic it means that the hosts may join and leave groups at any time. In order to allow hosts on networks to indicate whether they wish to join or leave a particular multicast group there is a protocol called Internet Group Message Protocol IGMP. Thus this protocol lets the system know which hosts currently belong to which multicast group. This information is required by the multicast routers to know which multicast data packet is to be forwarded into which interface.

The IGMP is a part of the IP layer and the IGMP messages are transmitted in IP data packets. The version 1 of IGMP is described in RFC 1112 "Host extensions for IP multicasting" S. E. Deering, Aug. 01, 1989, RFC 2236 "Internet Group Management Protocol, Version 2" W. Fenner, November 1997 describes the version 2. The IGMP has been developed for IP version 4. In Internet Protocol IP version 6 there is a similar protocol called Multicast Listener Discovery MLD, which is used for the same purpose as the IGMP. The description of the first version of MLD can be found in RFC 2710 "Multicast Listener Discovery (MLD) for IPv6" S. Deering, W. Fenner, B. Haberman, October 1999. However the messages used in MLD correspond to the IGMP messages. In the following the IGMP will be used as an example. Although this should not be restricted to the IGMP, the functionality of the invention is also given by usage of MLD.

In principle the IGMP uses two basic messages to fulfil its tasks, the membership report and the membership query message and the following rules are applied. The different versions of IGMP contain additional messages.

A multicast router sends a membership query at regular intervals to see if any host still belongs to any group. The router must send one query out each interface. The group address in the query is 0 since the router expects one response from a host for every group that contains one or more members on each host. It is also possible to send a membership query for one particular group rather than for all groups. A host responds to an IGMP query by sending one IGMP report for each group that still contains at least one user. A host joins a group also by sending the membership report.

Using the information received by applying the report and the query messages a table with its interfaces having at least one host in a multicast group is established. After the receiving of the multicast data, the router forwards the data out the interface, which has at least one member.

With IP multicast receivers do not need to know who or where the senders are to receive traffic from them and the senders do not need to know who the receivers are. Neither senders nor receivers need to care about the network topology as the network optimises delivery. The distribution of the information via the IP multicast is performed on the base of a hierarchical connection of the hosts, like for example a multicast delivery tree. Several algorithms have been proposed for building multicast distribution trees, like for example spanning trees, shared-trees, source-based trees, core-based trees. The descriptions of the corresponding algorithms can be found in "IP telephony: Packet-based multimedia communications systems" O. Hersent, D. Gurle, D. Petit, Addison-Wesley, Harlow, 2000. After the establishment of the multicast delivery tree, the distribution of the information is done by the IP multicast routing protocols. The detailed description of the corresponding IP multicast routing protocols can also be found in the above-mentioned document.

An advantage of the IP multicast is the support of the heterogeneous receivers. With the IP multicast it is possible to send different media to different multicast groups and the receivers decide which media is to be received in dependence on the own capability and/or preferences. Similarly, if a sender layers its video or audio stream, different receivers can choose to receive different amounts of traffic and hence different qualities. To do this the sender must code the video as a base layer it means with the lowest quality that might be acceptable and a number of enhancement layers, each of which adds more quality at the expense of more bandwidth. With video, these additional layers might increase the frame rate or increase the spatial resolution of the images or both. Each layer is sent to a different multicast group and receivers can individually decide how many layers to subscribe to and consequently to receive.

Multicasting in the internetworking between a fixed network and a mobile network like, General Packet Radio System GPRS or Universal Mobile Communication System UMTS causes some further problems. The impacts on the problems inter alia the mobility of the end users and low transmission bandwidth of the mobile network on the air interface. Further the communication in a mobile communication networks like for example in UMTS is a unicast communication. The unicast communication is also called point-to-point communication. The point-to-point communication means sending a message from a single sender to a single receiver. In such kind of network, in particular in the core network it is not foreseen to perform a multicast communication. The group communication is implemented by means of a point-to-point communication having a sender transmitting separately packets to each member of the group. For a group with n members, n packets are required on the whole way between the sender and the receivers, instead of one packet when multicasting is used.

In order to explain the problem occurring in a point-to-point oriented telecommunication system in the following an overview of the architecture of the General Packet Radio System GPRS network is given.

The GPRS is the packet-switched enhancement of the Global System for Mobile Communication GSM, which is a circuit switched network. It means that the user can be permanently online connected but has to pay only for the real data transfer. In order to fulfil the new requirements some changes are introduced into the GSM, among other new logical nodes, the Serving GPRS Support Node (SGSN) and the Gateway GPRS Support Node (GGSN) are introduced. The main functions of the GGSN involve interaction with external IP packet networks providing for example connections to Internet Service Providers ISPs. From the external IP network's point of view, the GGSN acts as a router for the IP addresses of all subscribers served by the GPRS networks. The GGSN also exchanges routing information with the external network. The SGSN serves all GPRS subscribers that are physically located within the geographical SGSN service area. It forwards incoming and outgoing IP packets addressed to or from a mobile station. Additional to the new logical nodes also new interfaces between the nodes are to be defined. For the invention in particular the Gn, Gi, Gp interfaces are relevant. The Gp interface is defined between GGSN nodes belonging to different operators. The Gn interface defines the IP based backbone between the SGSN and GGSN. The Gi is the interface between GGSN and a further network, like Internet. The restriction of GPRS is that GGSN and SGSN are to be connected in a way that IP is run on top of the technology chosen, meaning that SGSN and GGSN communicate via IP addresses. A detailed description of the architecture is to be found in 3GPP TS 03.60 V7.5.0 (2001-01) $3^{rd}$ Generation Partnership Project; Technical Specification Group Services and System Aspects, Digital cellular Telecommunications System (Phase 2+), General Packet Radio Service (GPRS), Service Description, Stage 2 (Release 1998).

The similar nodes and interfaces are also used in the next generation of the wireless networks, in the UMTS as described in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999). In order to distinguish between the functionality of these nodes in UMTS extended names are often used, 3G-SGSN and 3G-GGSN. In the following description it will not be distinguished between the GPRS and the UMTS nodes.

Figure 1:
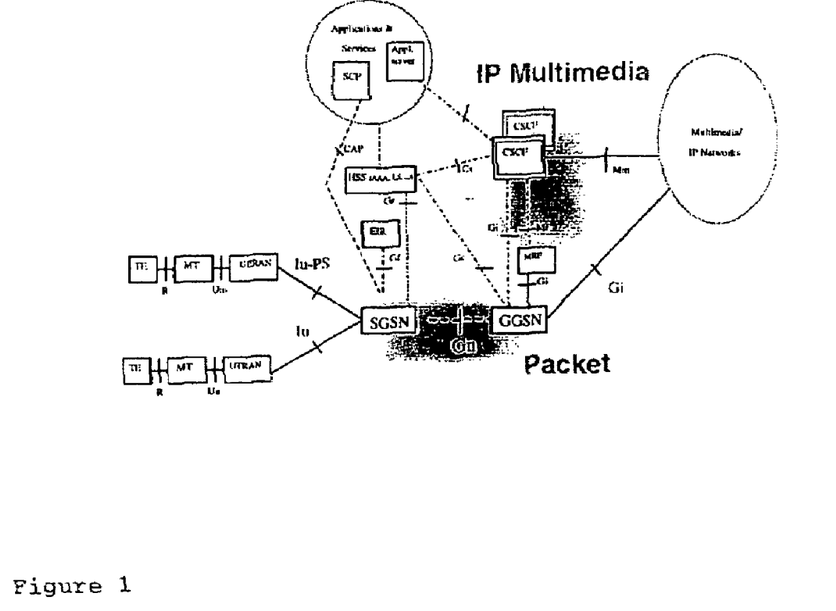
FIG. 1: GPRS architecture

In the following an overview of an UMTS network, as specified in the 3GPP specifications, UMTS Standard 23.060, in respect to FIG. 1 is given.

The FIG. 1 shows the core network as packet switching domain, indicated as Packet. The core network is connected to a radio network, depicted as Radio NW. On top of the packet switching domain of the core network, there is the IP Multimedia Subsystem (IMS), IP Multimedia for conversational multimedia services. Each of the subsystem includes the corresponding nodes. Relevant for the present invention are the nodes of the core network, the SGSN and the GGSN node with the involved interface Gn, Gi, which will be further described in more detail. The also relevant Gp interface is not depicted in FIG. 1. IMS as an example uses the packet switching domain to provide bearers for the conversational multimedia services. Streaming multimedia services are also possible without IMS by using for example a streaming server in the Internet on top of a corresponding packet switched bearer.

With the introduction of the streaming and of the conversational multimedia services, many new point-to-multipoint services will evolve. These will have high demands on the network infrastructure and consume considerable amounts of bandwidth. Some examples of such services are video-conferencing, whiteboarding, real-time multi-user games, multimedia messaging, virtual worlds.

According to FIG. 1 an external IP network, like the Internet is depicted as Multimedia/IP Network, the mobile station as TE and the core network as Packet. Currently the IP multicast messages in the UMTS are sent from a router settled in an external IP network transparently to the mobile station via a unicast connection. Then as already mentioned the multicast is performed on the IP layer and from the view of the mobile station TE the router in the Internet is the first node in which the IP connection terminates and therefore the first node applicable for multicast. It means the IP layer in the GGSN, which allows the communication to the external networks, is currently not seen as capable for performing multicast. The router sends multicast messages within the core part of the mobile network without distinguishing between a multicast message and a unicaut messages. The separation of the multicast flows is already done in the router in the Internet and the same data packets are sent over the wireless network multiple times depending on the number of recipients.

WO00/57601 discloses a solution for multicast transmission in a point-to-point network, wherein the multicast data is sent to the subscriber by means of a point-to-point connection in the core network. This means that the same data packets are sent over the wireless network multiple times depending on the number of recipients.

EP1071296 provides a method for multicasting within the core network on the application layer. However in order to transmit the multicast data probably a new signalling protocol is to be defined avoiding the tunnelling of the point-to-point protocol being located below said application layer otherwise also the point-to-point connections to every subscriber are to be established in order to transmit data.

It means the existing UMTS technology does not foresee the utilisation of efficient multicasting on the part of the network denoted by the Gn interface in the FIG. 1. Any service that is simultaneously provided to multiple clients is replicated at the edge of the wireless network and multiple unicast connections are used towards the clients. Especially with the evolution of the resources high-demanding streaming or conversational multimedia services this implies that the resources in the network are used very inefficiently.

Further the existing nodes are not prepared for performing the multicasting.

In general introducing and performing the multicast in a network, that is basically point-to-point oriented causes problems, than in such kind of networks a unicast channel is established for performing a communication between two nodes. It means the problem does not only occur in a wireless network like UMTS.

Further examples of protocols being multicast capable, are SIP (Session Initiation Protocol) or RTSP (Real-time Streaming Protocol) The SIP protocol is described in Multiparty Multimedia Session Control (MMUSIC) WG in IETF, and the ST5 is covered by RFC 2326 Real Time Streaming Protocol (RTSP) H. Schulzrinne, A. Rao, R. Lasnphier, April 1998. These protocols belong also to point-to-point oriented protocols and the following invention applies also for them.

SUMMARY AND DESCRIPTION OF THE INVENTION

It is an object of the present invention to provide a solution for an efficient introduction and performing of the multicast in a point-to-point oriented packet-switched telecommunication network.

The invention is embodied in a method, router, serving node and system as disclosed in claims 1, 14, 18 and 21. Advantageous embodiments are described in the dependent claims.

The basic idea is to introduce multicast transmission on a transport layer for parts of a telecommunication network in order to transmit multicast data to multicast group members or users. The said network can provide multicast groups by itself. It can be also connected to a further network, like for example to the Internet, having multicast groups to which it is possible to register to. Said network includes at least one router, for example a GGSN and at least one serving node, for example a SGSN. The router is logically connected to at least one serving node, this means that in-between physically further network nodes, like further routers can be involved. The router and the serving nodes are involved in the transmission of the multicast data to users. The user can be a node or a mobile station or any user equipment. In the further description a mobile station as an example will be used to describe the user. Although also a node can be see as a user. In general the users means a multicast group member.

The present invention proposes to use transport multicast group tunnel from the router to the serving nodes in order to transfer the multicast data over said tunnel to users registered to a multicast group. In order to establish the transport multicast group tunnel the following steps are to be performed. In the first step a request message for registration to a multicast group is sent from the user to the router. The router checks, whether the multicast group to which the user is registering already exists. In case it does not exist the router allocates a new transport level multicast group and a transport level multicast group tunnel is established to a serving node by means of a transport layer protocol for tunnelling Said transport level multicast group tunnel is assigned to the multicast group to which the user is registering. In case of a network being connected to a further network the router informs the neighbouring routers in the further network that there is at least one member of the particular multicast group if it is the first user registering to a multicast group. In case the multicast group to which the user is registering already exists the relation between the multicast group and the transport level multicast group tunnel is determined. The incoming multicast data said data is transferred over the transport level multicast group tunnel from the router to the serving node.

In a mobile environment like in UMTS the idea could be implemented by using IP multicast for efficient transmission in the IP network between the SGSN, which is an example of a serving node and GGSN, which is an example of a router. Further example is the link between SGSN and an UTRAN network.

An advantage of the invention is to provide efficient utilization of scarce and expensive network resources. In case of GPRS or UMTS efficient transmission on the Gn and Gp interface is achieved by transmitting only a single copy of a packet on each link. This reduces the overall transmission resources needed and limits the need for congestion prevention, load balancing algorithms, when multiple users for the same multicast group are located in the same or different SGSNs. This also applies to scenarios with heterogeneous subscriber equipment or access networks, since layering of the information can be used as described above in respect to FIG. 1.

It is proposed that the established transport multicast group tunnels between the router and at least one serving node build a multicast delivery tree. It means that the multicast data is transferred across the network and a replication of the multicast data is done as close to the user as possible in order to save the network resources. In case of having more then one users the replication of the multicast in order to forward the data to the users registered to the corresponding multicast group is performed in the serving node.

It is proposed that after the establishment of the transport multicast group tunnel an entry in the network is created with the relation between the transport level multicast group, the multicast group and the user. For this purpose a data structure for the administration of the relation between the transport level multicast groups, the registered user for the multicast group and the multicast address, which can be received for example from the further network is created. The administration of the data structures can be either distributed within network among network nodes or centralised, with an appointed node.

In a preferred embodiment of the invention the association is made by means of identifiers identifying uniquely the user, the multicast group and the transport level multicast group tunnel.

In order to perform de-registration of a mobile station from a multicast group a message is sent to the router, which initiates the updating of the entries in the data structure and in the corresponding nodes. The updating can be done by means of an existing control signalling protocol.

In an advantageous embodiment of the method in case the mobile station changes the serving node, which handles the mobile station, the mobile station is to be registered in the new serving node, deleted from the old serving node and the corresponding entries in the router are to be updated. This feature guaranties provisioning of the multicast service even when the user is in movement.

In case that a transport level multicast group tunnel is released besides of the updating of the data structures in the corresponding entries also the multicast delivery tree from the router towards the serving nodes is to be updated.

It is proposed that in order to guarantee compatibility and feasibility the transport layer protocol for tunnelling, which establishes the tunnel between the router and the serving node is a control signalling protocol as defined in the already existing architectures. For example in case of the UMTS it can be the GPRS Tunnelling Protocol GTP as disclosed in "ETSI: Universal mobile Telecommunications System (UMTS). General Packet Radio Service (GPRS); GPRS Tunnelling Protocol (GTP) across the Gn and Gp Interface" (3G TS 29.060 version 3.3.0 Release 1999)", January 2000 (2000-01). Said Protocol will be further described in more details. The already defined messages of this protocol can be used or the protocol can be enhanced by new defined signalling messages.

In an advantageous embodiment of the method the existing multicast solution, like for example the IP multicast can be applied. The IP multicast uses IP packets with an IP multicast address in order to define the route to the user according to a multicast routing table included in a multicast capable router.

Within the architecture like UMTS the tunnel established by means of the transport layer protocol for tunnelling uses an underling UDP and IP protocols for the purpose of transmitting the payload information.

In a preferred embodiment it is proposed that in order to deliver the multicast data to the user the identifier of the transport level multicast group tunnel is added in the router to the IP packets. The multicast IP packets are transmitted to the serving node, which removes the address from the IP packets and replicates it to the users, in case there are more then one user.

In a preferred embodiment of the present invention it is proposed to use the IGMP in order to register to a multicast group. These are well known protocols, which are already used for this purpose. In the present invention it is proposed to modify these protocols in order to enhance the saving of the network resources. This is achieved by sending a registering IGMP or MLD message from the user to the router. Thus this solution increases the utilisation of the network resources. In the existing implementation of these protocols the router sends an IGMP message to the clients and it is the task of the clients to response, whether they want to register to a multicast group.

In UMTS it is required that a mobile stations register to GGSN in order to receive payload information intended special for the mobile stations. This information is sent over a tunnelling channel, which is established during the PDP context activation procedure, as this is already known.

It is proposed to adapt a router to perform the multicast within a point to point oriented telecommunication network. The said router is connected on one side to a further network and on the other side to at least one serving node handling mobile stations. The router has logic for establishment of a transport level multicast group tunnel towards the serving nodes. This can be for example a protocol stack including the GTP level. In order to establish the relation between the multicast group for which the user is registering and the transport level multicast group tunnel, logic for assigning an identifier of a transport level multicast group, which corresponds to an identifier of a multicast group assigned in the further network is defined in the router. Further the router has logic for transport of the multicast data on the transport multicast group tunnels to the serving nodes. The transport includes receiving of the multicast data, analysing the address of the receiver, the translation of the address into the identifier of the-transport level multicast group tunnel and sending the multicast data to said tunnel.

In a preferred embodiment of the invention the router is on the top of the multicast delivery tree, which is created during the establishment of the transport level multicast group tunnels between the router and the serving nodes. Within the UMTS architecture this means that the GGSN establishes a transport level multicast group tunnels, where the GGSN is the root and the SGSN are leafs of the tree. The SGSN is linked to the tree only for the first user registering to the corresponding multicast group.

It is proposed that in order to administrate the relation between the dedicated transport level multicast groups, the registered users to the multicast group and the multicast address received from the further network, the router controls a data structure for this purpose.

The router can contain logic for propagation the multicast registration to the further network in case there is a communication with a further network. The propagation is required, when the user is the first one registering to a multicast group. This implies the nessecerity of informing the neighbouring routers in the further network that there is at least one member of the particular multicast group to whom the multicast data of the corresponding group are to be sent.

Further a serving node is adapted to perform a multicast within a telecommunication network having at least one router and at least one said serving node handling users. The serving node has a logic for receiving multicast data sent from the router on a transport multicast group tunnel. A logic for administration of a relation between the transport level multicast group and the users registered to a corresponding multicast group. This is required in order to know to which user the multicast data received from the transport level multicast group tunnel are to be sent. After defining the identifiers of users the multicast data are sent to the user by logic for serving the user registered to the corresponding multicast group.

The logic for serving the users has a function for replication the multicast data between the users in case there is more then one user registered to the multicast group and served by the serving node.

Within the created multicast delivery tree the serving node, which replicate the multicast data is the latest one in the tree and is to be seen as the leaf of the said tree.

Further it is proposed to have a system adapted to perform a multicast within a telecommunication network with at least one router and to at least one serving node handling users. The functionality of the router and of the serving node is enhanced by the above described features.

In the following a detailed description of the invention is given.

According to the invention the basic approach is disclosed in the following FIGS. 2 and 3.

Figure 2:
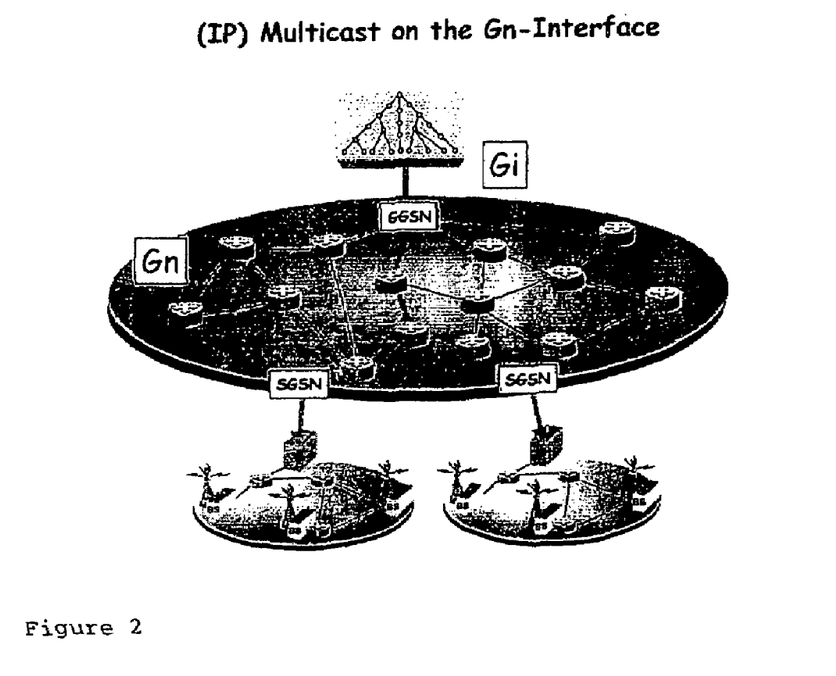
FIG. 2: Network related view of the basic idea of the invention

The upper part of FIG. 2 with the tree structure depicts multicast within an external IP network. The IP network is connected to a GGSN via a Gi Interface. The transmission from the GGSN to the SGSN goes via the Gn interface. It means that the messages can go via an amount of routers. This is shown in FIG. 2 by the middle part. The lower part depicts the different radio networks, which are served by the corresponding SGSN. The most important part of the figure is the middle part of the network, the Gn-interface where multicasting is applied to forward traffic from the GGSN to two SGSNs that propagate the traffic to the corresponding radio access networks.

Figure 3:
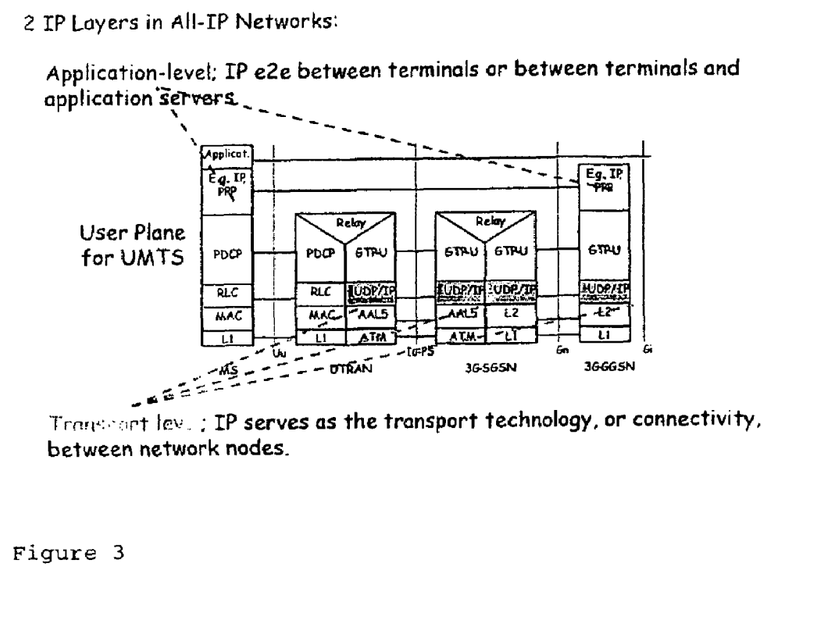
FIG. 3: Overview of the protocol stacks used for the UMTS userplane.

A protocol related view of the basic idea is reflected in the FIG. 3. The FIG. 3 shows architecture of a network as standardised in 3GPP. However this should not be seen as a restriction for the invention. The FIG. 3 shows a mobile station MS, which communicates over the Uu interface with an access network UTRAN. The Iu-PS interface connects UTRAN with 3G-SGSN, which communicates over the Gn interface with the 3G-GGSN. The FIG. 3 provides an overview of the different protocol -stacks in the different nodes used in the UMTS. The following description concentrates merely on the two IP layers in the packet switched domain, depicted as IP, PPP and UDP/IP, and on the GTP-U layer. In the FIG. 3 the other protocols are mentioned because of the complementary reasons.

The above-mentioned requirements and restriction for the functionality and communication manner of the introduced packet switched oriented nodes like SGSN or GGSN have their impact on the developed protocol stacks. As a result of the function of the GGSN as a router and as an interface to the external networks the IP layer below the application layer has been introduced. Further due to the restriction of having an IP network between the GGSN and the SGSN an IP logical connection is introduced as a transport mean, below the GTP-U layer.

Therefore in respect to FIG. 3 there are two IP layers, in the following described as an application IP and a transport IP layer. The application IP layer is located in the protocol stack directly below the application protocols, Applicat., and connecting the mobile station and the 3G-GGSN. This IP layer is transparent to the packet switching network, this is depicted in the FIG. 3 by a direct line going from the MS to the 3G-GGSN. The second IP layer is the transport IP layer used for the transmission between the SGSN, GGSN and UTRAN. The payload traffic is transported across the Gn encapsulated in an application-specific tunnelling protocol, the GPRS Tunnelling protocol GTP, which is an example of a transport layer protocol for tunnelling. GTP packets use UDP as a transport protocol. However there are different tunnelling protocols, which are responsible for building a tunnel. The GTP is merely an example.

The above mentioned requirements and restriction for the functionality and communication manner of the introduced packet switched oriented nodes like SGSN or GGSN have their impact on the developed protocol stacks. As a result of the function of the GGSN as a router and as an interface to the external networks the IP layer below the application layer has been introduced. Further due to the restriction of having an IP network between the GGSN and the SGSN an IP logical connection is introduced as a transport mean, below the GTP-U layer.

Figure 4:
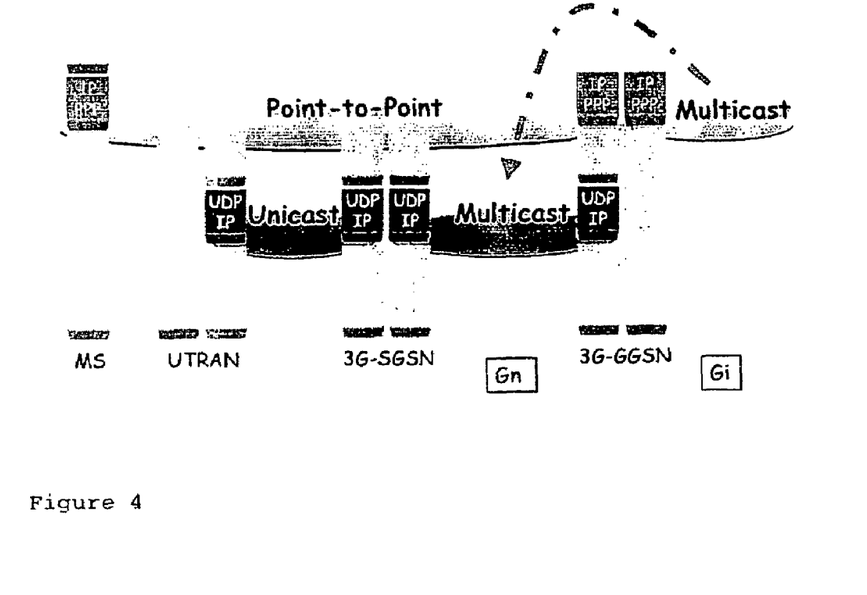
FIG. 4: Protocol related view of the basic idea of the invention.

The basic idea of the present invention is disclosed in respect to FIG. 4. It shows a mobile station MS with an Application layer, Appl., on the top of the protocol stack, with Internet Protocol IP or with Point to Point Protocol PPP on the network layer. The lower layers are depicted as L1 and L2 layers, because they can differ in the corresponding nodes in dependence on the underlying physical network. The logical IP or PPP connection from the mobile station terminates in the 3G-GGSN in this case. Between the UTRAN, the 3G-SGSN and 3G-GGSN the GTP-U protocol for building a tunnel between these nodes is used. Below the GTP-U an IP layer with UDP as a protocol for transport of the payload information is located.

The idea is to introduce the multicast functionality on the Ip layer below a tunnelling protocol, like for example GTP. In FIG. 4 the cloud between the 3G-SGSN and 3G-GGSN depicted as Multicast shows it. The arrow going from the Multicast cloud on the Gi interface to the Multicast cloud on the Gn interface shows the introduction of the multicast performed on the application IP layer to the transport IP layer. It means the to the 3G GGSN over the Gi interface arriving multicast data are redirected to the lower IP layer, which performs the multicast between the GGSN and the SGSN. The connection between the SGSN and the RNC in UTRAN remains unicast. Also the logical point-to-point connection on the IP layer is left.

In the following the enhanced functionality of the GGSN are described. This new functionality of the GGSN is required in order to perform the invention.

In order to fulfil the new tasks the GGSN has to act as a local multicast router, which is able to handle IGMP or MLD message arriving from the subscribers. The GGSN terminates the IGMP or MLD messages and propagates the relevant information via IGMP or MLD towards the neighbouring routers. The GGSN also handles the multicast routing protocols. The subscribers register for specific multicast groups in the GGSN and the GGSN keeps track of the active multicast groups in the packet switched network. So far, the GGSN acts very much like a standard local multicast router. In general a Public Land Mobile Network PLMN external local multicast router may be used instead of the GGSN itself.

Additionally, the GGSN creates a multicast group in the scope of the core network, it means between the GGSN and SGSN. This multicast group is further described as so called Transport Level Multicast Group TLMG. The GGSN then informs the corresponding SGSNs that these have mobile stations registered to the multicast groups.

A mobile station, which wants to receive multicast messages, has to inform the corresponding GGSN about its wish. For the first mobile station that registers to the multicast group, the SGSN joins the TLMG to receive the multicast traffic for the mobile station. In fact a source based multicast tree is created between the GGSN and all affected SGSNs. An SGSN can have one or more subscribers for the multicast group. IP multicast is used to deliver the data to the SGSNs upon which the SGSN replicates the packets and forwards these to the mobile stations concerned.

In the following a preferred embodiment of the invention is given. It describes multicasting on the Gn-interface. It means between the GGSN and SGSNs. Similar mechanisms can be used to apply transport-level multicast to other point-to-point networks, which are for example based on Real-time Streaming Protocol RTSP or Session Initiation Protocol SIP. Further the same mechanism is applicable for the Gp-interface, which is between the GGSN and an SGSN located in another PLMN.

In the following the establishment of the GTP tunnel is described. This is done during the so-called PDP-Context activation. The PDP context activation is like logging on the external IP network. For this aim a mobile subscriber identity is associated with an IP address. During the PDP Context Activation a tunnel with an identity, in the following described as TID is created between the SGSN and GGSN for the PDP context. During this procedure also a Quality of Service QoS negotiation takes place between the MS and the SGSN/GGSN.

In the following the PDP Context Activation procedure is described in respect to FIG. 5.

Figure 5:
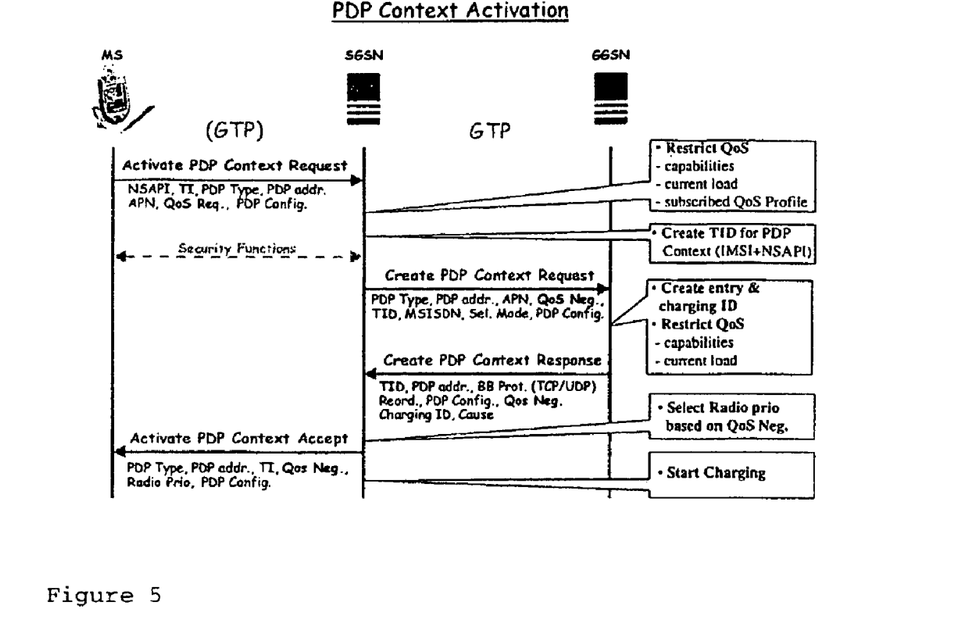
FIG. 5: PDP Context Activation procedure.

The FIG. 5 shows a time sequence of the sent messages between a mobile Station MS a SGSN and a GGSN. An arrow indicates a sent message. Above an arrow the name of the message is given and below the arrow the main parameters of the corresponding message are listed. The boxes on the right side show the action, which are performed in a node after receiving a message. An adequate meaning of the symbols apply also to the following figures.

In respect to FIG. 5 a description of the PDP Context Activation procedure is given. In the following description merely the most relevant aspect of this procedure are discussed.

In the first step the Activate PDP Context Request message is sent from the mobile station to the SGSN. Among other parameters the Quality of service requirements are also sent. After receiving of said message the SGSN checks whether it can fulfil the requirements of the mobile station and then it creates a TID for the corresponding PDP Context. The Create PDP Context Request message is sent from the SGSN to the GGSN among other with the negotiated QoS parameters and with the created TID as parameters. The GGSN create an entry after receiving this message and it also checks the possibility of fulfilling the QoS requirements. The Create PDP Context Response message is sent as result to the SGSN, which selects according to the received QoS parameters an appropriate radio transmission capability. Consequently it sends an acknowledgement message to the MS, the Activate PDP Context Accept and it starts to charge the attached mobile station MS.

Figure 6:
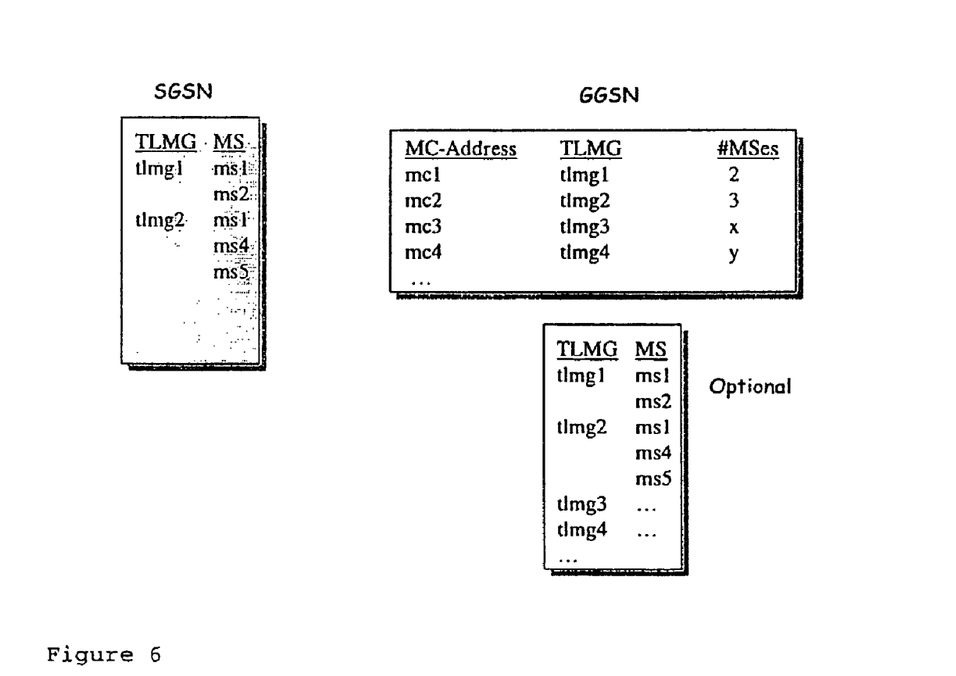
FIG. 6: Data structure for administration for the entries according to the invention.

The FIG. 6 shows a data structure as it is used in the example signalling scenarios described below. In general, the data can be centralized or distributed in any way and the information transfer between the different network entities is adapted accordingly.

The FIG. 6 shows the node SGSN and the node GGSN with the actual entries. The SGSN has currently two transport-level-multicast-groups TLMGs, tlmg1 and tlmg2. The first group contains two mobile station ms1 and ms2 and the second group has three mobile station registered to the multicast group, ms1, ms4 and ms5. The number of the mobile stations registered to multicast groups is also administered in the GGSN. In FIG. 6 in GGSN this is depicted as the column #Mses. The GGSN administrates the established TLMGs, the TLMG column and the MC-Address column includes the multicast addresses of the multicast group in the further network. As an option it can be foreseen that the GGSN contains also the mobile stations registered to a transport-level-multicast-group, tlmg. This is depicted in FIG. 6 as the separate table, optional. This table includes a list of tlmgs with the belonging mobile stations. For example the tlmg 1 manages the mobile stations MS1 and MS2.

The administration of the entries is managed on the following way. The SGSN stores besides the TLMGs identification also the identification of the mobile stations registered to the multicast group assigned to the corresponding TLMG. The GGSN stores the relation between the multicast address, for example mc1 and the corresponding TLMG, tlmg1. Furthermore, a counter is used to keep the track of the number of mobile stations per multicast group and consequently per TLMG, for example in case of mc1, tlmg1 it is 2. The GGSN may additionally store the mobile stations per TLMG. This information can be useful while a change of the SGSN or while a deletion of the PDP context. Another solution is to store in the GGSN indicators for the PDP-contexts of an MS that has registered to one or more multicast groups.

In the following a preferred embodiment of the invention is given. It describes the Multicast Group Registration and TLMG Establishment between the GGSN and the SGSN. As already mentioned this method can be also applied for other interfaces towards the user. The description is based on FIG. 7, which shows the time sequence of the events.

Figure 7:
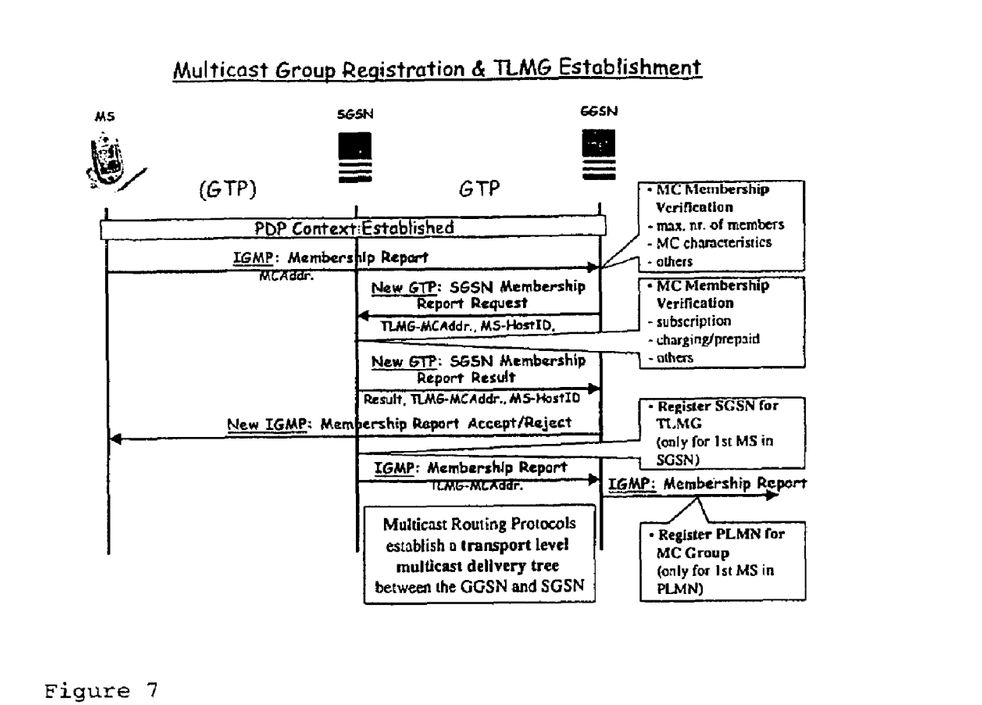
FIG. 7: Multicast Group registration and TLMG Establishment procedure

In the first step the PDP context is established as described in respect to FIG. 5. In order to register to a multicast group it is a task of the mobile station MS to initiate it. Different from local multicast routers as specified in IGMP the GGSN does not send out membership queries to all mobile stations with an active PDP context. This would merely waste scarce radio resources. Instead, the mobile stations MSs initiate the joining of a multicast group by themselves. Without being requested by a membership query message, for example IGMP query message the MSs report their membership by means of a IGMP membership report message. The GGSN terminates the IGMP protocol and stores information about the multicast group membership of the MS. This message includes the multicast address, MCAddr., as a parameter. Since in IGMP as specified only one member per multicast group reports the membership, the local multicast router only knows that there is at least one member for the corresponding multicast group connected to the local network. The local multicast router does not know how many members are connected and also not the identities of those members. However, in case each multicast group member reports its membership as described above, the GGSN not only knows the amount of multicast group members per multicast group, but also the identities of all group members. This information can be used for efficiency, charging or statistical purposes. It is also possible to just store the number of mobile stations and the SGSNs that are part of the TLMG and to receive the information from the corresponding SGSNs when needed on request. In case the corresponding SGSNs with multicast group members are not stored, the TLMG itself may be used to multicast an All Membership Request to all affected SGSNs. The GGSN can take the number of group members into account to decide whether a TLMG is a lot more efficient or whether it is acceptable to use replicated unicast sessions instead.

Optionally one of the existing messages may be updated to contain a membership query. This may apply for example to the Router Advertisement message as specified in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999).

In respect to FIG. 7 at the next step MC Group Membership Verification in GGSN is done in order to determine whether the mobile station is allowed to register for the multicast group. It may be for example that security checks do not allow the mobile station to join the multicast group or that the operator does not allow the multicast group registration because of the characteristics of the group or that the maximum number of the allowed multicast group members has been reached. Several other checks may be performed in the GGSN. In case of unsuccessful results, the GGSN sends a Membership Report Reject message back to the MS and does not continue with the sequence as described below. As an option an existing error message can be reused.

To be able to determine whether hosts are part of closed groups or not, the GGSN can have an external interface to a server or database that administers the multicast groups or the GGSN can administrate this kind of information by itself.

In case the multicast group as indicated in the IGMP Membership Report does not exist in the GGSN yet, the GGSN creates a new entry for this. Additionally, the GGSN creates a Transport-Level-Multicast-Group TLMG on the transport IP layer for the multicast arriving on the application IP level. For this purpose the GGSN allocates a multicast address from the core network's address space. In the following it will be called the Multicast IP Address of the TLMG or alternative TLMG-McAddress or simply TLMG address. In order to create the proper TLMG, the GGSN can take the negotiated Quality of Service QoS requirements from the PDP context into account. It is also possible to just provide the TLMG address to the SGSN, as described below and create the logical TLMG in the GGSN only upon reception of a positive result from the SGSN.

The GGSN informs the corresponding SGSN that it has mobile stations registered to a multicast group by means of for example enhanced GTP protocol. A new GTP message, SGSN Membership Report Request can be used. It is also possible to use existing message, for example an enhanced Packet Data Unit PDU notification message on the UDP connection for this purpose.

The SGSN Membership Report Request message contains information required for the replication of the multicast stream into multiple unicast streams in the SGSN, like for example the TLMG-MCAddress and the MS-HostID, which is the Host ID of the MS that is registered to the Multicast Group. Thus for the multicast group traffic the GGSN ignores the tunnel that is already established for that MS by the SGSN during the PDP context activation and rather uses TLMGs, which form a multicast delivery tree. This kind of multicast delivery tree will be called in the further description a TLMG delivery tree.

After receiving the SGSN Membership Report Request message the SGSN makes Multicast Group MC Membership Verification. In particular it means that the SGSN can do subscription check or charging accounts check to determine whether the mobile station is allowed to register for any or for this specific multicast group. The result of the verification is included in SGSN Membership Report Result message. In case of a negative verification result, the SGSN will return a SGSN Membership Report Result message, which can be accompanied by a cause indication in case of a negative result, back to the GGSN, indicating that the multicast verification has not been successful and that the mobile station should not join the application-level multicast group. In case of a positive verification result, this message indicates a successful outcome to the GGSN. Furthermore, the SGSN then stores the relation between the TLMG-MCAddress and the MS-HostID, for example by simply adding the TLMG-MCAddress to the existing PDP-context information for that MS, to be able to replicate the data and forward these to the corresponding hosts at reception of the multicast data stream.

Upon receipt of the SGSN Membership Report Result, the GGSN returns a Membership Report Accept or Membership Report Reject, possibly containing a cause indication, depending on the outcome of the verification. This is a new message, which is not specified in IGMP. It is also feasible to send an existing error message only in case of a negative result. Otherwise, when the result of the membership report is positive, none information message is sent back.

In case of a successful SGSN Membership Report Result, the counter for the number of MSes for the multicast group and consequently for the TLMG is stepped and/or the MS-HostID is added to the multicast group.

Whenever a SGSN has a first MS that registers to a multicast group and the SGSN itself is registered to the TLMG and added to the TLMG multicast delivery tree, then the SGSN sends an IGMP Membership Report message to the GGSN. Furthermore, the IGMP Membership Report message uses the negotiated Quality of Service QoS received during the PDP context activation for selecting the correct QoS path from the SGSN to the GGSN. Existing multicast routing tree protocols can be used for this purpose.

The GGSN takes care of the multicast membership propagation via the backbone network over the Gi-interface by sending the IGMP Membership Report. The membership propagation to neighbouring routers is only required to indicate that there is at least one member of the corresponding multicast group in the local network, for example PLMN, which wants to receive multicast data. Therefore this propagation is only required for the first multicast group member within the PLMN. Thus, if a multicast group is unknown at the GGSN, the GGSN propagates the membership report message via the Gi interface to the next multicast router in the further network to join the multicast group. The GGSN knows whether it should propagate the message on the Gi-interface from the counter for the number of mobile stations registered to a multicast group or the actual mobile stations.

In the following a preferred embodiment of the invention is given. It describes the Multicast Group De-Registration & TLMG Release in respect to FIG. 8.

As described before no periodic Membership Query messages is sent to all MSes with an active PDP context. In IGMP version 1 the local multicast router determines whether there are still members left for a multicast group on the local area network by periodically multicasting membership query messages. In IGMP version 2 a Leave Message has been defined to reduce the latency of leaving members.

Figure 8:
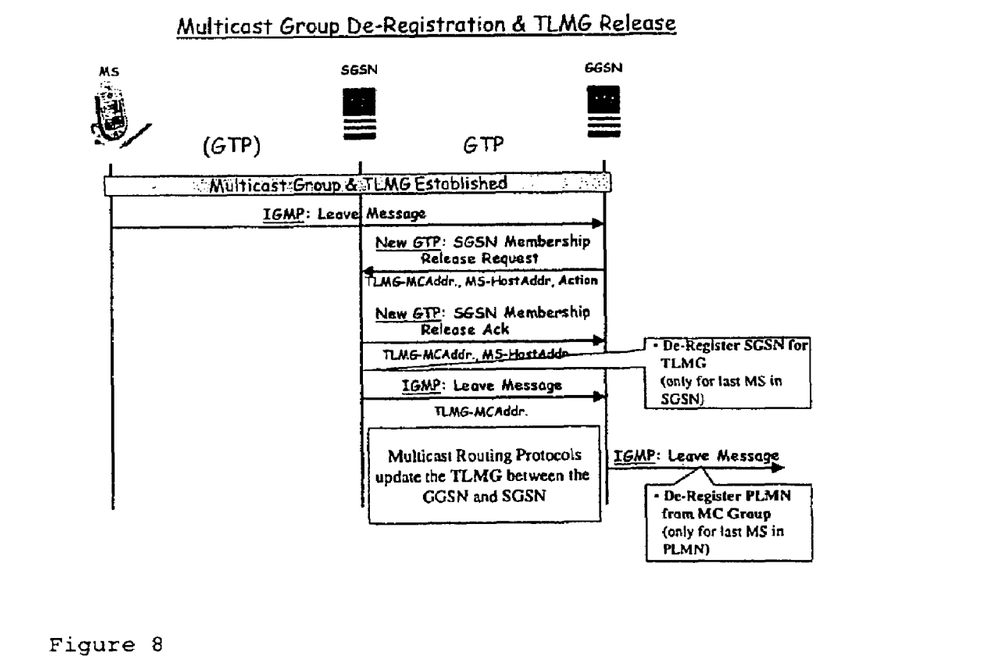
FIG. 8: Multicast Group De-Registration & TLMG Release

In respect to FIG. 8 at the reception of the IGMP-Leave Message from the mobile station, the GGSN performs the basic checks, for example it checks whether the mobile station was part of the multicast group. The CGSN then sends a new GTP message, the SGSN Membership Request Release, to the SGSN to request the membership release for that mobile station. This message carries as parameter the TLMG MCAddr and the address of the mobile station, MS-HostID. The SGSN confirms the release by sending an optional acknowledge message, SGSN Membership Release ACK back to the GGSN and removes the mobile station from the list for the corresponding TLMG. Also the GGSN removes the mobile station from the list for the corresponding multicast address or just decreases the corresponding counter.

In case this mobile station was the only mobile station in the SGSN service area registered to the multicast group, the SGSN is removed from the TLMG delivery tree. Optionally, the GGSN may decide that the number of multicast group members in that SGSN does not justify the use of a multicast delivery tree towards that SGSN and that the SGSN is to be de-registered from the TLMG.

In case the SGSN removed the last mobile station from the multicast group or was ordered to de-register from the TLMG, it sends an IGMP Leave message to the GGSN to be released from the TLMG delivery tree. The TLMG delivery tree can be updated by the multicast routing protocols.

In case the GGSN determines that the last multicast group member in the PLMN has de-registered from the multicast group, this information is propagated towards the neighbouring routers over the Gi-interface. In case IGMP v2 or a later version is used, the GGSN sends an IGMP leave message. Otherwise, the GGSN just does not refresh the multicast group membership on the Gi-interface any longer.

Figure 9:
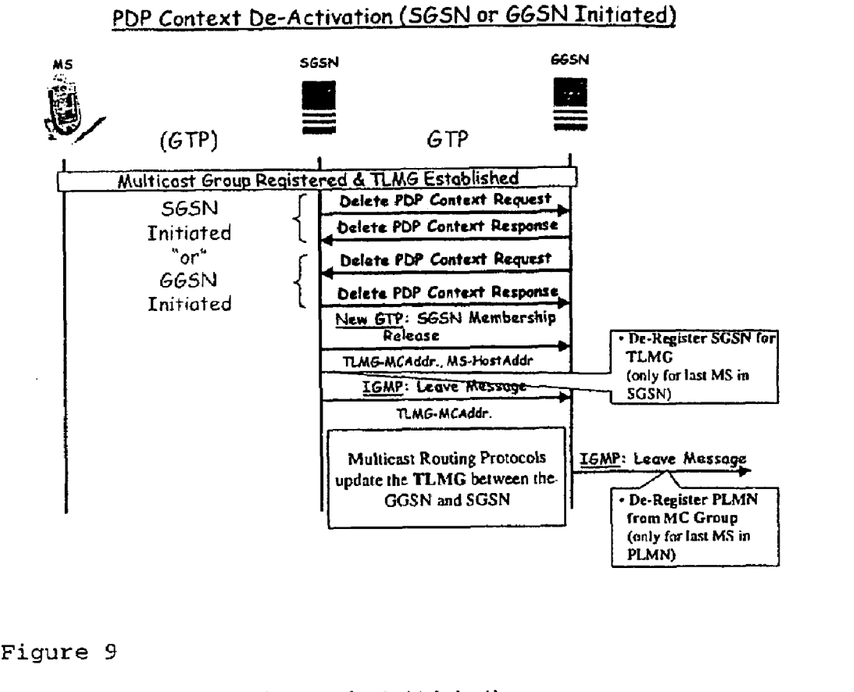
FIG. 9: PDP Context Deactivation

In the following a preferred embodiment of the invention is given. It describes PDP Context Deactivation in respect to FIG. 9.

A PDP Context Deactivation is initiated by the SGSN or the GGSN. The PDP Context Deactivation contains two signalling messages, the Delete PDP Context Request and the Delete PDP Context Response. The node, which initiates the deactivation sends the Delete PDP Context Request and as an answer it receives the Delete PDP Context Response. This procedure is detailed described in 3GPP TS 03.60 V7.5.0 (2001-01) $3^{rd}$ Generation Partnership Project; Technical Specification Group Services and System Aspects, Digital cellular Telecommunications System (Phase 2+), General Packet Radio Service (GPRS), Service Description, Stage 2 (Release 1998) and in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999).

After the performed PDP Context Deactivation the same procedure with the corresponding signalling messages as for the multicast group de-registration is applied. The SGSN checks whether the mobile station was part of one or more TLMGs. Accordingly to the result the mobile station is removed from the TLMG or from the corresponding TLMGs. The SGSN possibly de-registers itself from the TLMG or TLMGs, depending on whether this was the last mobile station for the corresponding TLMG or TLMGs.

If the GGSN stores mobile stations has per Multicast group and consequently per TLMG and not only a counter, the GGSN can check itself whether the mobile station is part of one or more multicast groups and act accordingly. Otherwise, the SGSN either informs the GGSN in the Delete PDP Context Request and Delete PDP Context Response message by means of new information elements specifying the MS-HostID and the TLMG or a new message is used from the SGSN to the GGSN with the same information elements, SGSN Membership Release.

At reception of the SGSN Membership Release message or a similar message as described above, the same handling applies as described for the multicast group de-registration and TLMG release sequences. With a subsequently sending of the IGMP Leave message from the SGSN to GGSN and further over the Gi interface.

In the following a preferred embodiment of the invention is given. It describes the procedure, when a mobile station changes the serving SGSN area.

In case a mobile station changes the serving SGSN, the multicasting information stored in the SGSN and GGSN must be changed and adapted accordingly and the TLMG may have to be updated.

As described in 3GPP TS 03.60 V7.5.0 (2001-01) $3^{rd}$ Generation Partnership Project; Technical Specification Group Services and System Aspects, Digital cellular Telecommunications System (Phase 2+), General Packet Radio Service (GPRS), Service Description, Stage 2 (Release 1998) and in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999), an MS can change the serving SGSN due to a GPRS Attach, due to the Inter SGSN Routing Area Update or due to the Serving Radio Network Subsystem SRNS Relocation The GPRS Attach is described in section 6.5.3 in 3GPP TS 23.060 V3.6.0 (2001-01) $3^{rd}$ Generation Partnership Project; Technical Specification Group Services and System Aspects, General Packet Radio Service (GPRS), Service Description, Stage 2 (Release 1999), the Inter SGSN Routing Area Update in section 6.9.1.2.2 in the same document, including the Inter SGSN Inter System Change in section 6.13.2. The Serving SRNS Relocation is to be found in section 6.9.2.2.1 of the above mentioned reference.

However the GPRS Attach case does not need to be considered for multicasting, since the mobile station will not be registered to a multicast group when invoking this procedure. The reason for it is that the mobile station is already de-registered from the corresponding multicast groups because of the performed PDP-context deleting.

In case of an Inter SGSN Routing Area Update or Serving SRNS Relocation the new SGSN sends an Update PDP Context Request to the GGSN.

There are three basic alternatives for taking care of the multicast administrations in the SGSNs and GGSN in case the SGSN is changed for a multicast group member.

In the first alternative the Multicast Group De-Registration and TLMG Release for the old SGSN and the Multicast Group Registration and TLMG Establishment for the new SGSN procedures as they are described above are combined.

Figure 10:
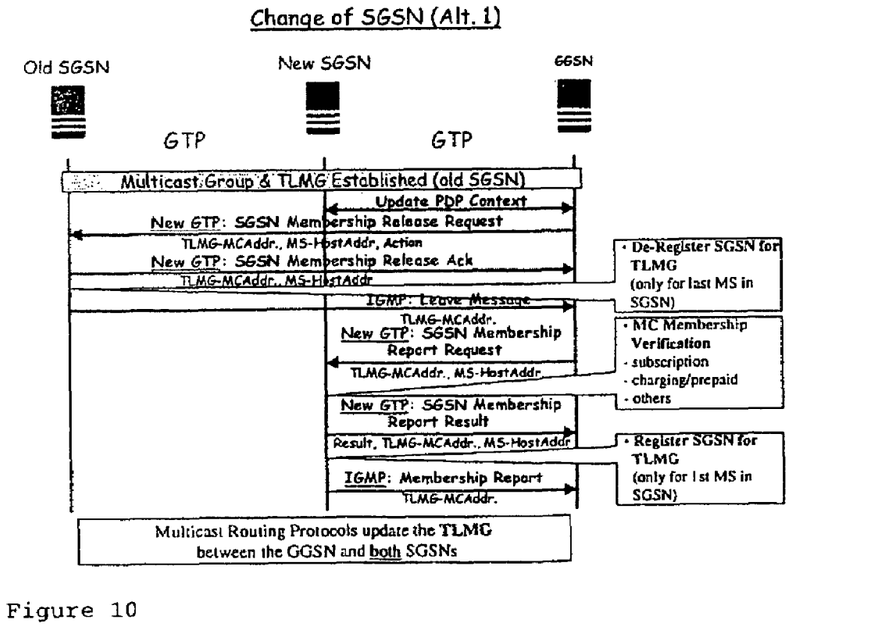
FIG. 10: First alternative for performing the procedure of changing SGSN

The following description is based on FIG. 10.

Similar to the PDP context deactivation described above, the SGSN may have to indicate to the GGSN that the mobile station is part of a multicast-group by a modified Update PDP Context message signalling. In this sequence the GGSN must be informed about the identifier of TLMG. It is the task of the GGSN to inform the old and the new SGSN about the changes. Old SGSN means the SGSN, where a mobile station was registered and new SGSN is the SGSN, by which a mobile station is being currently handled. The old SGSN is informed by the means of the SGSN Membership Release Request message. As an acknowledgement for the performed SGSN change the old SGSN sends a SGSN Membership Release Ack. In case the old SGSN released the last mobile station an IGMP Leave message it sent.

The Multicast membership verification in the new SGSN is optional. The GGSN may use an additional indicator in the SGSN Membership Report Request message to specify whether these checks are to be done or not. If no checks are done, it is enough to report back an acknowledgement to the GGSN by sending the SGSN Membership Report Result or to have no reporting back to the GGSN at all in case of reliable communication. In case an additional Multicast membership verification is done the GGSN may have to send a negative result back to the mobile station. In that case the SGSN may have to de-register from the TLMG and the PLMN may have to de-register from the multicast group. These message sequences are not shown in the FIG. 10.

Whenever a SGSN has a first mobile station that registers to a multicast group, the SGSN itself is registered to the TLMG and added to the TLMG multicast delivery tree. The SGSN sends an IGMP Membership Report message to the GGSN.

The TLMG delivery tree is already updated for the IGMP leave message and once more for the IGMP membership report message. That is, the TLMG delivery tree is updated in two steps.

Figure 11:
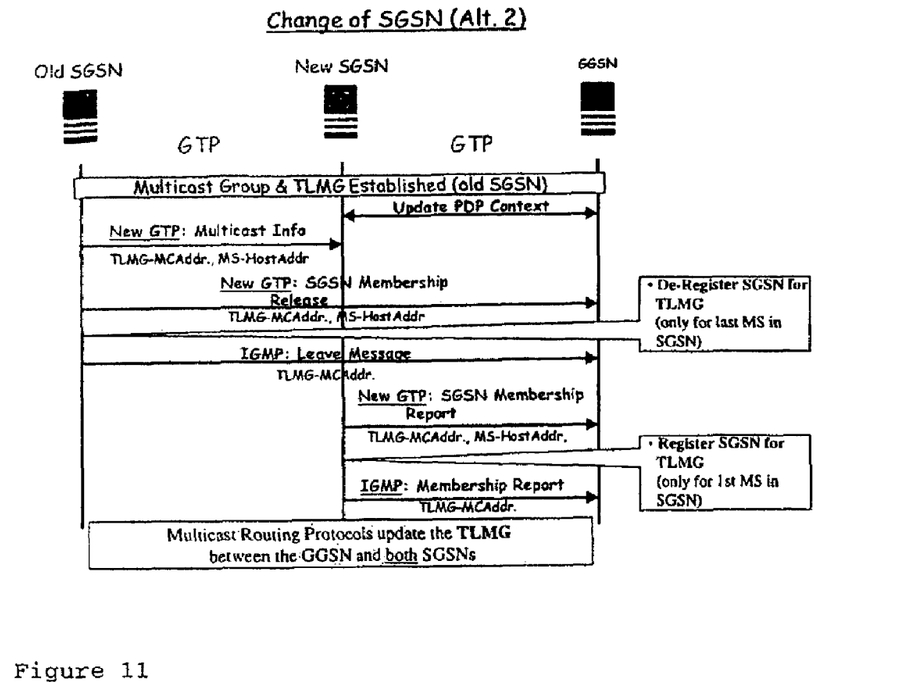
FIG. 11: Second alternative for performing the procedure of changing SGSN

In the second alternative the multicast group information is directly transferred from the old to the new SGSN by sending a Multicast Info message after the performed Update PDP Context as it is also disclosed in FIG. 11. The old SGSN initiates by means of the SGSN Membership Release the deleting of its entries in the GGSN. Subsequently an IGMP Leave message is sent. The SGSN may optionally do verification and depending on the outcome, refrain from sending an SGSN Membership report and an IGMP Membership report to the GGSN. The SGSN would in that case report to the GGSN that a reject message is to be sent to the mobile station. Therefore also here the same principles as for the first alternative can be applied.

Figure 12:
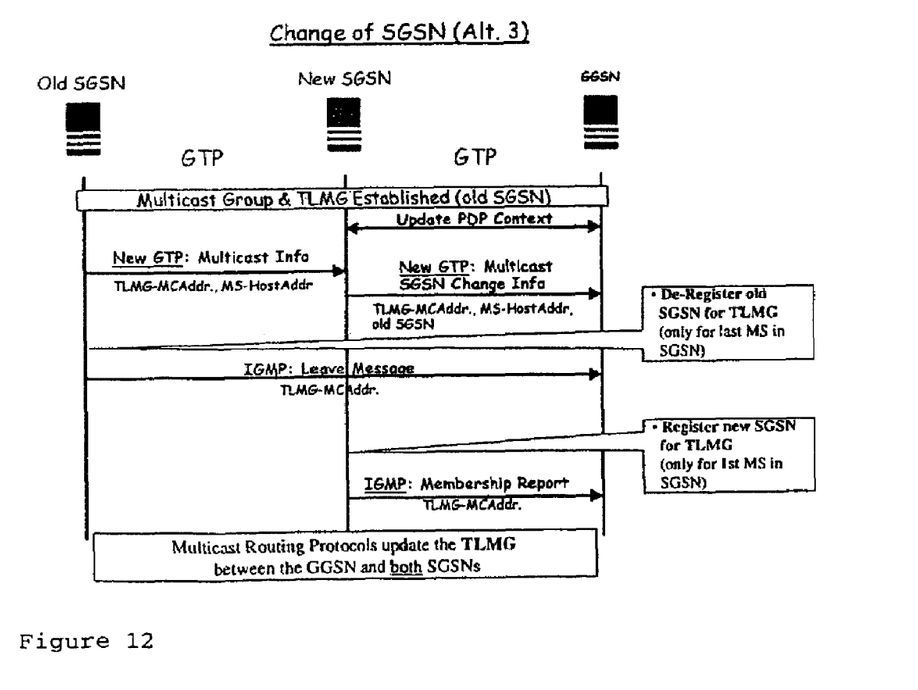
FIG. 12: Third alternative for performing the procedure of changing SGSN.

The third alternative discloses a shortcut solution where the new SGSN after receiving the Multicast Info message from the old SGSN sends an update message, the Multicast SGSN Change Info to GGSN in order to update the multicast entries in the old and the new SGSN at the GGSN. This exchange of signalling messages is also shown in FIG. 12. After performing the mentioned message exchange, an IGMP leave message is sent.

Finally in all three alternatives, the TLMG is updated, for both the old and new SGSN by means of the multicast routing protocols. In alternatives two and three the multicast info transfer from the old to the new SGSN may also be done before sending the Update PDP Context between the new SGSN and the GGSN. The Update PDP Context message exchange may be also extended with the multicast info.

In all three alternatives an additional message may be sent to the mobile station in case the in the new SGSN performed check do not accept the multicast group membership. This may for example apply when the new SGSN does not support the multicast routing protocols or does not support the multicast info exchange messages or information elements like for example multi-vendor environment. The MS is then ordered to send an IGMP Leave message to the GGSN in order to de-register.

In the following a preferred embodiment of the invention is given. It describes the Multicast Data Delivery procedure in respect to FIG. 13.

Figure 13:
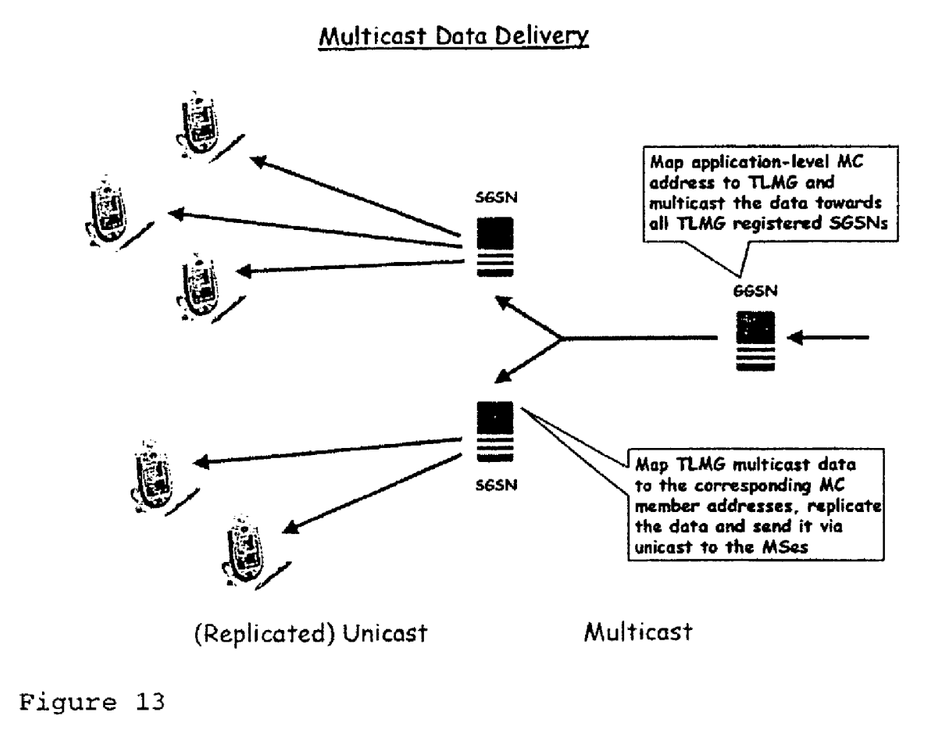
FIG. 13: Multicast data delivery tree.

The FIG. 13 shows a scenario where multicast data is received at the GGSN and forwarded via the TLMG to two SGSNs that each has multiple group members connected.

At reception of the multicast data stream, the GGSN looks in its tables for the TLMG address belonging to the application level multicast address. The GGSN then changes for example the IP destination address to the TLMG multicast address and multicasts the data to all SGSNs that are part of the TLMG. At reception of the TLMG multicast data in an SGSN, this SGSN looks in its tables for the multicast group members, restore original address, replicates the data and uses unicast transmission to forward the data via the radio access network to the mobile stations. The additional information that was available in the info received from the GGSN is used to determine the corresponding multicast group members connected to that particular SGSN.

In an alternative implementation the IP multicast data stream is tunneled via a multicast tunnel. The TLMG Multicast address is added in front of the IP multicast packet in the GGSN and removed in the SGSN. The TLMG multicast address is used to tunnel the data from the GGSN to the SGSN along the multicast delivery tree, like for example the TLMG deliver tree.

In a slightly modified scenario, the GGSN acts as Cell Broadcast Service (CBS) or similar, as specified in 3GPP TR 25.925 $3^{rd}$ Generation Partnership Project; Technical Specification Group Radio Access Network; Radio Interface for Broadcast/Multicast Services (Release 1999, thereby providing a relay function between IP multicast in the core network and broadcast/multicast services in the radio access network.

In another scenario the Cell Broadcast Centre or similar would register to the TLMG instead of the SGSN. Once a multicast bearer is defined in the RAN, the multicasting in the core and the radio network can be connected to provide an even more efficient transmission for point-to-multipoint services.

The solutions described in this invention merely cover the information exchange between the different network entities. It should be understood that the data storage may be distributed in different ways and that other messages may be used as carrier for the same or different information.

In the messages in the described signalling sequences, some of the information elements may be omitted when a connection-oriented approach is being used. Furthermore, instead of several dedicated new for example GTP messages, a common message with a an additional activity code may be used instead.

The signalling sequences in this report are based on reliable transmission. In case of unreliable transmission, the sequences must be adapted accordingly.

Further the solution covered in this invention focuses on the packet switched domain in a GSM or UMTS network. However, the solution can generally be applied to networks with 2 IP layers, one application IP-level and one transmission IP-level, such as is the case when tunnelling is applied. In general, the idea can be applied whenever tunneling is used, for example in GTP, L2TP, IPSec, Mobile IP. Also for case where the transport layer is based on another technology that supports multicast transmission, like for example ATM, the mechanisms can be applied.

Further, it should be understood that the same mechanisms can be applied for example to create a multicast transport group for application like point-to-multipoint streaming (RTSP) or conversational multimedia services (SIP).

The invention claimed is:

1. A method for performing multicast transmission of multicast data in at least one multicast group within a telecommunication network having at least one router and at least one serving node handling at least one user and providing a protocol stack having a multicast-capable-application-transmission layer used for performing said multicast transmission of multicast data in at least one multicast group wherein said multicast-capable-application-transmission layer is located above a point-to-point-layer said method comprising the following steps a request message of the user for registration to a multicast group is received by the router and, if the user is the first one registering to the multicast group
a transport level multicast group tunnel is established between the router and the serving node by means of transport layer protocol for tunnelling on the transport layer, located below the point-to-point layer, providing a point-to-multipoint connection and said tunnel is assigned to the multicast group redirecting the multicast transmission from the multicast-capable-application-transmission layer to the transport layer, otherwise the relation between transport level multicast group tunnel and the multicast group is determined and, transmission of the multicast data is routed over the transport level multicast group tunnel from the router to the serving node and, transmission of the multicast data from the serving node to the user registered to the corresponding multicast group is performed.

2. The method according to claim 1, wherein between the router and at least one serving node a dedicated multicast delivery tree is created.

3. The method according to claim 1, wherein a data structure for the administration of the association between the transport level multicast groups, the registered user for the multicast group and a multicast address of the multicast group is either distributed within the network or centralized.

4. The method according to claim 3, wherein the association is made by means of identifiers identifying uniquely the user, the multicast group and the transport level multicast group tunnel.

5. The method according to claim 1, wherein in order to perform registration or de-registration of a user to or from a multicast group, the user informs the router, the router informs the serving node and an updating of the corresponding entries in the data structure is performed.

6. The method according to claim 1, wherein if the user changes the serving nodes a registration of the user to the new serving node, deleting from the old serving node and update of the corresponding entries in the router are performed.

7. The method according to claim 1, wherein in case of the release of a dedicated transport level multicast group tunnel, the multicast delivery tree from the router towards the serving nodes is updated.

8. The method according to claim 1, wherein the transport layer protocol for tunnelling is a control signalling protocol.

9. The method according to claim 8, wherein the control signalling protocol is the GPRS Tunnelling Protocol (GTP) Protocol.

10. The method according to claim 8, wherein the transport layer protocol for tunnelling uses an underling UDP and IP protocols for the transport of the payload information between two nodes.

11. The method according to claim 1, wherein the multicast is an IP-multicast using IP packets with IP multicast address in order to define the route to the users according to a multicast routing table included in a multicast capable router.

12. The method according to claim 1, wherein the identifier of the transport level multicast group tunnel is added in the router to the IP packets and removed in the serving node.

13. The method according to claim 1, wherein the registration or de-registration of the user to or from a multicast group is done by means of IGMP or MLD Protocol.

14. The router according to claim 13, wherein the router controls a data structure for the administration of the relation between the transport level multicast group tunnel, the registered users to the multicast group and the multicast address of the multicast group.

15. A router adapted to perform a multicast in at least one multicast group within a telecommunication network having at least one of said router and at least one serving node handling users and providing a protocol stack having a multicast-capable-application-transmission layer used for performing said multicast transmission of multicast data in at least one multicast group wherein said multicast-capable-application-transmission layer is located above a point-to-point-layer, said router comprising logic for establishment of a transport level multicast group tunnel towards the servings nodes by means of transport layer protocol for tunnelling on the transport layer, located below the point-to-point layer, providing a point-to-multipoint connection and, logic for assigning an identifier of a transport level multicast group, which corresponds to an identifier of a multicast group assigned in the further network in order to redirect the multicast transmission from the multicast-capable-application-transmission layer to the transport layer and logic for transport of the multicast data on the transport multicast group tunnel to the at least one serving node.

16. The router according to claim 15, wherein the router is a network node on the root of a created multicast delivery tree.

17. The router according to claim 15, wherein the router has logic for propagating the multicast registration to a further network.

18. A serving node adapted to perform a multicast within a telecommunication network having at least one router and at least one said serving node handling users and providing a protocol stack having a multicast-capable-application-transmission layer used for performing said multicast transmission of multicast data in at least one multicast group wherein said multicast-capable-application-transmission layer is located above a point-to-point-layer, said serving node comprising:

logic for receiving multicast data sent from the router on a transport multicast group tunnel and, logic for administration of a relation between the transport level multicast group tunnel and the users registered to a corresponding multicast group and logic for serving the users registered to the corresponding multicast group with multicast data, replication of the received among the users.

19. The serving node according to claim 18, wherein the logic for serving the users has a function for replicating the multicast data between the users in case there is more then one user registered to the multicast group and served by the serving node.

20. The serving node according to claim 18, wherein the serving node is a leaf of a created multicast delivery tree.

* * * * *

UNITED STATES PATENT AND TRADEMARK OFFICE
CERTIFICATE OF CORRECTION

PATENT NO. : 7,369,541 B2
APPLICATION NO. : 10/481072
DATED : May 6, 2008
INVENTOR(S) : Hundscheidt et al.

It is certified that error appears in the above-identified patent and that said Letters Patent is hereby corrected as shown below:

On the Title Page, in Item (54), in Title, in Column 1, Line 1, delete "POINT-TO POINT" and insert -- POINT-TO-POINT --, therefor.

In Column 1, Line 1, delete "POINT-TO POINT" and insert -- POINT-TO-POINT --, therefor.

In Column 4, Line 32, delete "unicaut" and insert -- unicast --, therefor.

In Column 5, Line 5, delete "ST5" and insert -- RTSP --, therefor.

In Column 20, Line 11, in Claim 15, delete "servings" and insert -- serving --, therefor.

Signed and Sealed this

Twenty-first Day of April, 2009

JOHN DOLL
*Acting Director of the United States Patent and Trademark Office*